United States Patent
Aoshima

(10) Patent No.: US 7,633,196 B2
(45) Date of Patent: Dec. 15, 2009

(54) VEHICLE-USE ALTERNATOR

(75) Inventor: Toshihisa Aoshima, Nagoya (JP)

(73) Assignee: Denso Corporation, Kariya (JP)

( * ) Notice: Subject to any disclaimer, the term of this patent is extended or adjusted under 35 U.S.C. 154(b) by 352 days.

(21) Appl. No.: 11/641,675

(22) Filed: Dec. 20, 2006

(65) Prior Publication Data

US 2007/0138879 A1 Jun. 21, 2007

(30) Foreign Application Priority Data

Dec. 21, 2005 (JP) ............... 2005-367318

(51) Int. Cl.
- *H02K 9/00* (2006.01)
- *H02K 9/06* (2006.01)
- *H02K 5/24* (2006.01)
- *H02K 5/20* (2006.01)

(52) U.S. Cl. ......................... 310/58; 310/89

(58) Field of Classification Search ............ 310/58, 310/51, 89, 62, 63; 415/119, 195, 203, 206, 415/207

See application file for complete search history.

(56) References Cited

U.S. PATENT DOCUMENTS 5,650,675 A * 7/1997 Kanaya et al. ............... 310/58
6,417,585 B1 * 7/2002 Oohashi et al. ............. 310/58

FOREIGN PATENT DOCUMENTS

| JP | 07-079543 A2 | 3/1995 |
| JP | 2000-069714 A | 3/2000 |

* cited by examiner

*Primary Examiner*—Quyen Leung
*Assistant Examiner*—Leda Pham
(74) *Attorney, Agent, or Firm*—Oliff & Berridge, PLC

(57) ABSTRACT

The vehicle-use alternator includes a cooling fan rotating in one with a rotating shaft thereof to generate cooling air diffusing substantially in a radial direction of the rotating shaft, to thereby cool a stator thereof. A housing thereof rotatably supporting the rotating shaft and housing the rotor is provided with a plurality of supporting members circumferentially spaced on a periphery thereof to which the stator is secured, and a plurality of ribs formed on the periphery which are circumferentially arranged between the supporting members so as to form a plurality of cooling air discharge windows circumferentially arranged on the periphery. The ribs are inclined towards a downstream side with respect to a rotational direction of the rotor, and shaped that their inclination angles towards the downstream side between two adjacent ones of the supporting members reduce with increasing distance from a closer one of the two adjacent ones of the supporting members.

5 Claims, 2 Drawing Sheets

VEHICLE-USE ALTERNATOR

CROSS-REFERENCE TO RELATED APPLICATION

This application is related to Japanese Patent Application No. 2005-367318 filed on Dec. 21, 2005, the contents of which are hereby incorporated by reference.

BACKGROUND OF THE INVENTION

1. Field of the Invention

The present invention relates to an alternator (AC generator) mounted on a vehicle such as a passenger car or a truck.

2. Description of Related Art

Recently, the engine noise of a vehicle such as a passenger car or a truck has been steadily reduced to meet the social demand for the reduction of vehicle noise, and also to increase merchantability of the vehicle. However, reducing the engine noise tends to make the noise of auxiliaries rotating at relatively high speeds which are mounted on the same vehicle, especially a vehicle-use alternator, more harsh and conspicuous.

There have been proposed various techniques for reducing the noise of a vehicle-use alternator, while improving the self-cooling capability of the vehicle-use alternator by making changes to the shape around cooling air discharge windows formed in a housing of the alternator. For example, Japanese Patent Application Laid-open No. 2000-69714 discloses smoothing a cooling air flow by streamlining ribs made so as to form cooling air discharge windows, to thereby reduce the drag force of the cooling air flow. Japanese Patent Application Laid-open No. 7-79543 discloses reducing the drag force of a cooling air flow by elaborating on the inclination of ribs around support members of a housing of a vehicle-use alternator.

However, the structures disclosed in the above described patent documents have a problem in that the fan noise of the vehicle-use alternator is not reduced much, because the reduction of the drag force of the cooling air flow around the ribs or the support members of the housing causes the cooling air flow to increase that much. In addition, although there occurs abrupt change in the cooling air flow at a boundary portion between the support member and the adjacent cooling air discharge window, that causes large wind pressure variation which can be a leading cause of the fan noise, no consideration on this is given in these documents.

SUMMARY OF THE INVENTION

The present invention provides a vehicle-use alternator comprising:

a rotating shaft driven by a vehicle engine;

a rotor having a field winding wound therearound and rotating in one with the rotating shaft;

a stator having a stator winding wound therearound and fixed outwardly of the rotor;

a cooling fan rotating in one with the rotating shaft to generate cooling air diffusing substantially in a radial direction of the rotating shaft, to thereby cool the stator; and a housing rotatably supporting the rotating shaft and housing the rotor, the housing being provided with a plurality of supporting members circumferentially spaced on a periphery thereof to which the stator is secured, and a plurality of ribs formed on the periphery which are circumferentially arranged between the supporting members so as to form a plurality of cooling air discharge windows circumferentially arranged on the periphery, the cooling air being discharged through the plurality of cooling air discharge windows;

wherein the ribs are inclined towards a downstream side with respect to a rotational direction of the rotor, and shaped such that inclination angles towards the downstream side of the ribs located between two adjacent ones of the supporting members reduce with increasing distance from closer one of the two adjacent ones of the supporting members.

The present invention having the configuration in which the inclination of the rib closer to the supporting member is larger than the rib remoter from the supporting member makes it possible to suppress the abrupt change in the flow of the cooling air at the boundary portion between the supporting member and the adjacent cooling air discharge window, and accordingly to suppress the wind pressure variation at this boundary portion. Hence, according to the present invention, it is possible to sufficiently reduce the fan noise occurring at the boundary portion between the supporting member and the adjacent cooling air discharge window.

The ribs may be shaped such that inclination angles of walls on the downstream side of the ribs located between the two adjacent ones of the supporting members reduce with increasing distance from closer one of the two adjacent ones of the supporting members.

The ribs may be shaped such that inclination angles of walls on an upstream side with respect to the rotational direction of the rotor of the ribs located between the two adjacent ones of the supporting members reduce with increasing distance from closer one of the two adjacent ones of the supporting members.

The inclination angles of the ribs may increase towards radially outwardly.

The ribs may be shaped such that widths of the ribs located between the two adjacent ones of the supporting members gradually reduce in the direction from the upstream side to the downstream side with respect to the rotational direction of the rotor.

Other advantages and features of the invention will become apparent from the following description including the drawings and claims.

PREFERRED EMBODIMENTS OF THE INVENTION

Figure 1:
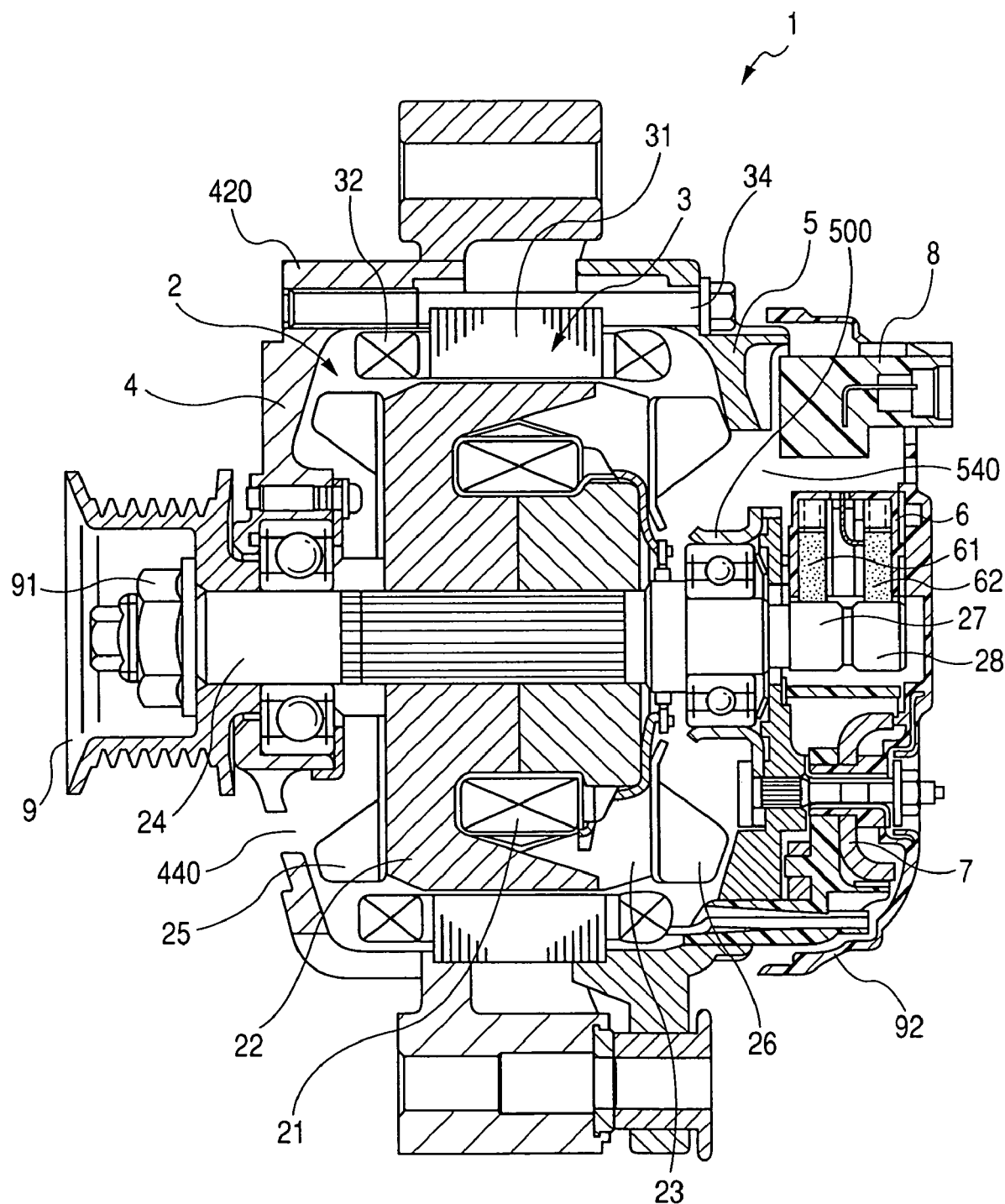
FIG. 1 is a cross-sectional view of a vehicle-use alternator according to an embodiment of the invention.

FIG. 1 is a cross-sectional view of a vehicle-use alternator 1 according to an embodiment of the invention. As shown in this figure, the vehicle-use alternator (simply referred to as the alternator hereinafter) 1 includes a rotor 2, a stator 3, a front side housing 4, a rear side housing 5, a brush device 6, a rectifier 7, a voltage regulator 8, and a pulley 9.

The rotor 2 includes a front side field core 22 and a rear side field core 23 each mounted to a rotating shaft 24 and having six or eight claw portions, between which a field winding 21 made of a copper wire concentrically wound in a cylindrical shape is held. A cooling fan 25, which may be of the axial-flow type, or a mix of the axial-flow type and the centrifugal type, is fixed by welding to an end surface of the front side field core 22 in order to suck in cooling air from the front side and blows it in the axial direction and the radial direction. Likewise, a cooling fan 26 of the centrifugal type is fixed by welding to an end surface of the rear side field core 23 in order to suck in cooling air from the rear side and blows it in the radial direction.

The rotating shaft 24 is provided with, at its rear end, slip rings 27, 28 electrically connected to both ends of the field winding 21. The brush device 6 is installed in such a state that brush members 61, 62 thereof are in slide contact with the slip rings 27, 28, respectively, so that an excitation current flows from the rectifier 7 to the field winding 21.

The stator 3 has a stator core 31 formed with evenly spaced slots in which a three-phase stator winding 32 are wound. The rectifier 7, which is for full-wave rectifying the three-phase AC voltage induced in the three-phase stator winding 32 of the stator 3 to generate a DC output voltage, includes a positive terminal side radiator plate, a negative terminal side radiator plate, and rectifying elements mounted by soldering to these radiator plates.

The front side housing 4 and the rear side housing 5 house the rotor 2 and the stator 3 such that the rotor 2 is supported rotatably around the rotating shaft 24, while the stator 3 is fixedly located outwardly of the field cores 22, 23 so as to form a certain circumferential gap with these field cores. The stator 3 is secured to four evenly circumferentially spaced support members 420 by through bolts 34.

The voltage regulator 8 operates to regulate an output voltage of the alternator 1 (the output voltage of the rectifier 7) at a constant value by controlling the field current supplied to the field winding 21 depending on electrical loads and a power generation amount. The pulley 9, which is for transmitting rotation of a vehicle engine (not shown) to the rotor 2, is fixed to a front end of the rotating shaft 24 by a nut 91. To protect the brush device 6, the rectifier 7, and the voltage regulator 8, the rear side housing 5 is provided with a rear cover 92.

When the rotation of the vehicle engine is transmitted to the rotor 2 through the pulley 9, the rotor 2 rotates in a certain direction. In this state, by supplying the excitation current to the field winding 21 to excite the claw portions of the field cores 22, 23, a three-phase AC voltage is induced in the stator winding 32, as a result of which the rectifier 7 outputs a DC current from its output terminal.

When the cooling fan 25 rotates in one with the rotor 2, cooling air is sucked in through cooling air intake windows 440 formed in the front side housing 4. The field winding 21 is cooled by an axial component of the flow of this cooling air, and a front side coil end of the stator winding 32 is cooled by a radial component of the flow of this cooling air.

Likewise, when the cooling fan 26 rotates in one with the rotor 2, cooling air is sucked in through cooling air intake holes formed in the rear cover 92. This cooling air cools the rectifier 7 and the voltage regulator 8, and then is led to the cooling fan 26 through intake passages 540 within the rear side housing 5 to be radially diffused, so that a rear side coil end of the stator winding 32 is cooled.

Figure 2:
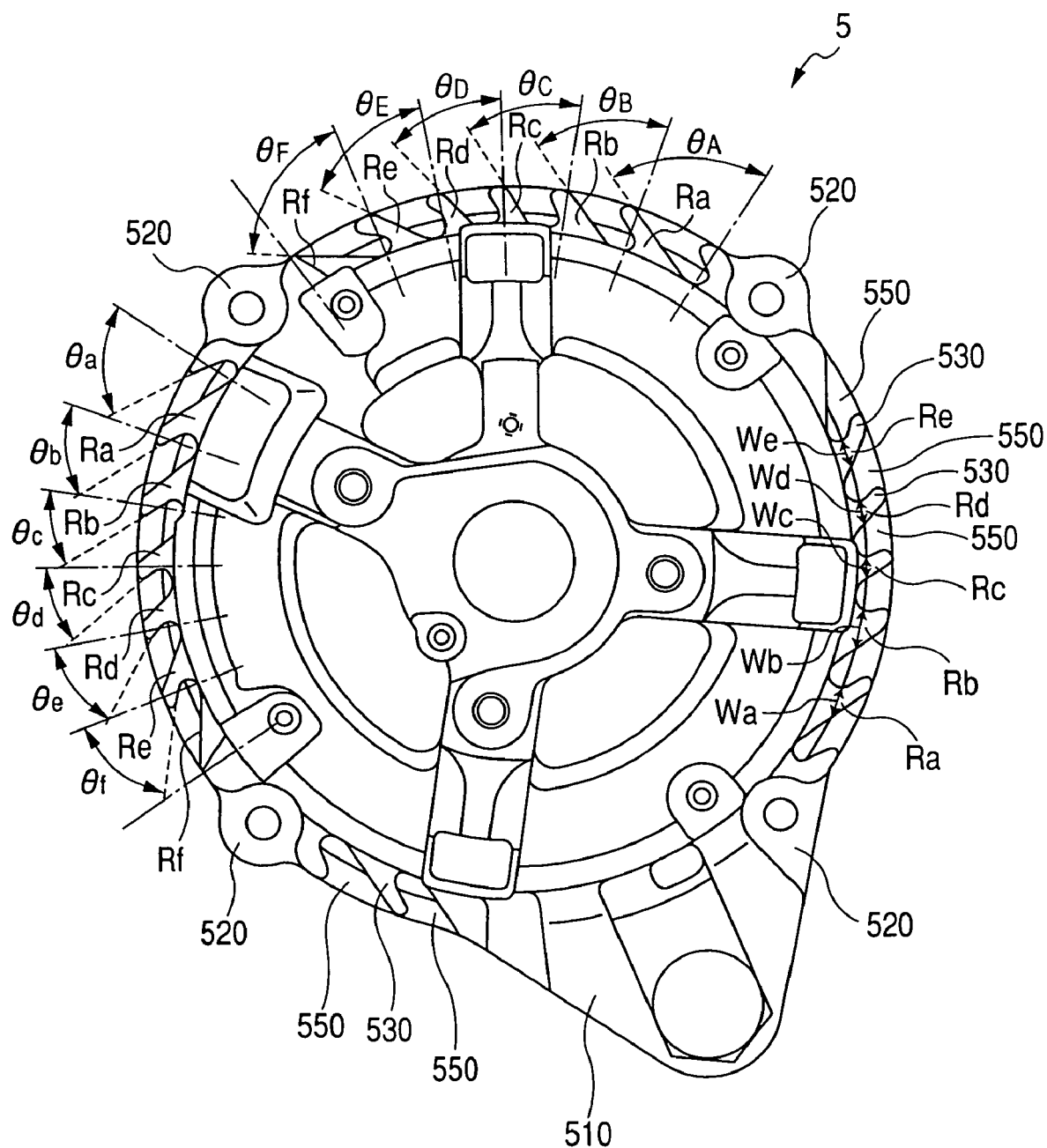
FIG. 2 is a plan view of a rear side housing of the vehicle-use alternator according to the embodiment of the invention.

Next, details of the rear side housing 5 are explained with reference to FIG. 2 which is a plan view of the rear side housing 5. As shown in FIG. 1 and FIG. 2, the rear side housing 5 includes a bearing housing member 500 facing the rear side end surface of the rotor 2 and housing a rear side bearing, a stay 510 for installation of the alternator 1 to an engine block (not shown), and four circumferentially evenly spaced support members 520. Two of the four support members 520 are located near a root portion of the stay 510. Each of the support members 520 has a bolt housing portion. The stator 3 is installed by inserting the through bolts 34 into the bolt housing portions of the support member 520 with a front part thereof being housed in the front side housing 4, and tightening the through bolts 34.

The rear side housing 5 is provided with a plurality of ribs 530 at its periphery which are circumferentially arranged between the supporting members 520 so as to form a plurality of cooling air discharge windows 550 through which the cooling air diffused by the cooling fan 26 is discharged. As shown in FIG. 2, the ribs 530 are inclined towards the downstream side with respect to the rotational direction of the rotor 2, and the inclination angle of the ribs 530 increase towards radially outwardly, so that the cooling air is discharged smoothly from the rotor 2.

When a set of the ribs 530 located between two adjacent supporting members 520 are designated as Ra, Rb, Rc, Rd, Re, and Rf in the direction from one supporting member 520 on the upstream side with respect to the rotational direction of the rotor 2 to the other supporting member 520 on the downstream side, and the angles which upstream side walls of the ribs Ra, Rb, Rc, Rd, Re, and Rf make with the radial direction of the rotating shaft 24 are designated as $\theta_a$, $\theta_b$, $\theta_c$, $\theta_d$, $\theta_e$, and $\theta_f$, respectively, the relationships of $\theta_a > \theta_b > \theta_c$, and $\theta_f > \theta_e > \theta_d$ is satisfied, so that the downstream side wall of the rib closer to the supporting member 520 makes a larger angle with the radial direction of the rotor 2 than the rib remoter from the supporting member 520.

In addition, when the angles which the downstream side walls of the ribs Ra, Rb, Rc, Rd, Re, and Rf make with the radial direction are designated as $\theta_A$, $\theta_B$, $\theta_C$, $\theta_D$, $\theta_E$, and $\theta_F$, respectively, the relationships of $\theta_A > \theta_B > \theta_C$, and $\theta_F > \theta_E > \theta_D$ are satisfied, so that the upstream side wall of the rib closer to the supporting member 520 makes a larger angle with the radial direction than the rib remoter from the supporting member 520.

It is preferable that the widths of the ribs 530 (the circumferential lengths of lower base portions of the ribs 530 on the periphery of the rear side housing 5) between two adjacent supporting members 520 increase gradually in the direction from the upstream side to the downstream side. That is, when the widths of the ribs Ra, Rb, Rc, Rd, and Re are designated as Wa, Wb, Wc, Wd, and We, respectively, it is preferable that the relationship of Wa>Wb>Wc>Wd>We is satisfied.

The above described configuration in which the inclination of the rib closer to the supporting member 520 is larger than the rib remoter from the supporting member 520 makes it possible to suppress the abrupt change in the flow of the cooling air at the boundary portion between the supporting member 520 and the adjacent cooling air discharge window 550, and accordingly to suppress the wind pressure variation at this boundary portion. Hence, according to this embodiment, it is possible to sufficiently reduce the fan noise occurring at the boundary portion between the supporting member 520 and the adjacent cooling air discharge window 550.

Furthermore, if the widths of the ribs 530 between two adjacent supporting members 520 are set to increase gradually along the rotational direction of the rotor 2, it becomes possible to reduce a frequency component of a specific order number contained in the fan noise which is harsh to hear, occurring when the cooling air passes through the cooling air discharge windows 550.

It is a matter of course that various modifications can be made to the above described embodiment.

For example, the above described configurations of the embodiment may be applied to the ribs and the cooling air discharge windows of not the rear side housing 5 but the front side housing 4, or may be applied to the both of them.

In contrast to the above described embodiment, the widths of the ribs may be gradually reduced in the direction from the upstream side to the downstream side with respect to the rotational direction of the rotor 2. Also in this case, it is possible to reduce the component of a specific order number contained in the fan noise which is harsh to hear.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use alternator comprising:
   a rotating shaft driven by a vehicle engine;
   a rotor having a field winding wound therearound and rotating in one with said rotating shaft;
   a stator having a stator winding wound therearound and fixed outwardly of said rotor;
   a cooling fan rotating in one with said rotating shaft to generate cooling air diffusing substantially in a radial direction of said rotating shaft, to thereby cool said stator; and
   a housing rotatably supporting said rotating shaft and housing said rotor, said housing being provided with a plurality of supporting members circumferentially spaced on a periphery thereof to which said stator is secured, and a plurality of ribs formed on said periphery which are circumferentially arranged between said supporting members so as to form a plurality of cooling air discharge windows circumferentially arranged on said periphery, said cooling air being discharged through said plurality of cooling air discharge windows;
   wherein said ribs are inclined with respect to a radial direction of said rotating shaft, and shaped such that inclination angles of said ribs located between two adjacent ones of said supporting members reduce with increasing distance from each one of said two adjacent ones of said supporting members.

2. The vehicle-use alternator according to claim 1, wherein said ribs are shaped such that inclination angles of walls on said downstream side of said ribs located between said two adjacent ones of said supporting members reduce with increasing distance from each of said adjacent ones of said supporting members.

3. The vehicle-use alternator according to claim 1, wherein said ribs are shaped such that inclination angles of walls on an upstream side with respect to a rotational direction of said rotor of said ribs located between said two adjacent ones of said supporting members reduce with increasing distance from each of said adjacent ones of said supporting members.

4. The vehicle-use alternator according to claim 1, wherein said inclination angles of said ribs gradually reduce with increasing distance from each of said adjacent ones of said supporting members.

5. The vehicle-use alternator according to claim 1, wherein said ribs are shaped such that widths of said ribs located between said two adjacent ones of said supporting members gradually reduce in the direction from said upstream side to said downstream side with respect to a rotational direction of said rotor.

* * * * *